(12) United States Patent
Shaked

(10) Patent No.: US 12,588,049 B2
(45) Date of Patent: *Mar. 24, 2026

(54) FREQUENCY DOMAIN SCHEDULING BASED ON FREQUENCY DEPENDENT RESIDUAL SIDE BAND CANCELLATION CAPABILITY

(71) Applicant: QUALCOMM Incorporated, San Diego, CA (US)

(72) Inventor: Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 18/048,730

(22) Filed: Oct. 21, 2022

(65) Prior Publication Data

US 2024/0137964 A1 Apr. 25, 2024
US 2024/0237044 A9 Jul. 11, 2024

(51) Int. Cl.
*H04W 72/541* (2023.01)
*H04W 72/0453* (2023.01)
*H04L 25/03* (2006.01)

(52) U.S. Cl.
CPC ..... *H04W 72/541* (2023.01); *H04W 72/0453* (2013.01); *H04L 25/03159* (2013.01)

(58) Field of Classification Search
None
See application file for complete search history.

(56) References Cited

U.S. PATENT DOCUMENTS

| | | | | |
|---|---|---|---|---|
| 2008/0261607 | A1* | 10/2008 | Craig | H04W 72/541 |
| | | | | 455/450 |
| 2021/0328837 | A1* | 10/2021 | Pick | H04B 7/0621 |
| 2021/0377094 | A1* | 12/2021 | Yunusov | H04L 27/3863 |
| 2022/0141064 | A1* | 5/2022 | Horn | H04W 72/23 |
| | | | | 370/329 |
| 2024/0291585 | A1 | 8/2024 | Regev et al. | |

* cited by examiner

*Primary Examiner* — The Hy Nguyen
(74) *Attorney, Agent, or Firm* — QUALCOMM Incorporated

(57) ABSTRACT

Various aspects of the present disclosure generally relate to wireless communication. In some aspects, a user equipment (UE) may transmit, to a network node, information that indicates a frequency dependent residual side band (FDRSB) cancellation capability. The UE may receive, from the network node, information that indicates a frequency domain (FD) allocation assigned to the UE to mitigate FDRSB interference at the UE based at least in part on the information that indicates the FDRSB cancellation capability. Numerous other aspects are described.

30 Claims, 13 Drawing Sheets

600 ⟶

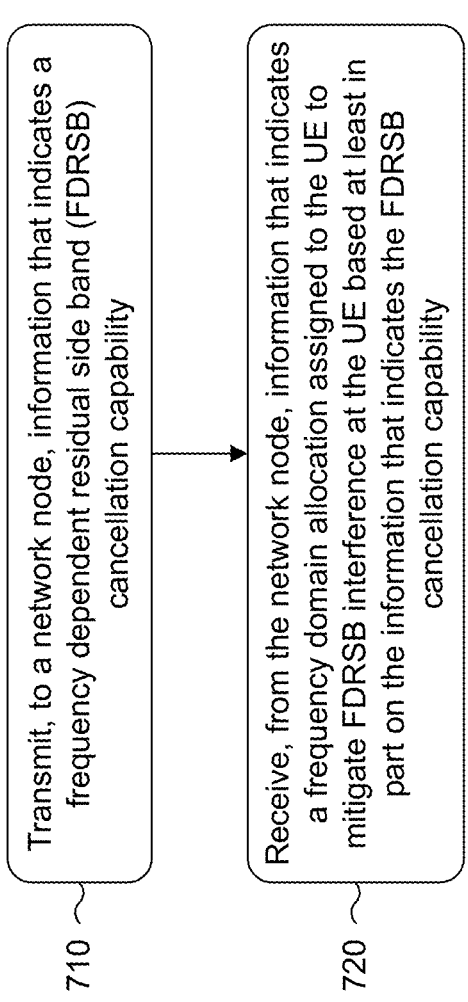

700

710 — Transmit, to a network node, information that indicates a frequency dependent residual side band (FDRSB) cancellation capability 720 — Receive, from the network node, information that indicates a frequency domain allocation assigned to the UE to mitigate FDRSB interference at the UE based at least in part on the information that indicates the FDRSB cancellation capability

FIG. 7

810 — Receive, from a UE, information that indicates a frequency dependent residual side band (FDRSB) cancellation capability of the UE 820 — Transmit, to the UE, information that indicates a frequency domain allocation assigned to the UE to mitigate FDRSB interference at the UE based at least in part on the FDRSB cancellation capability of the UE

800

FREQUENCY DOMAIN SCHEDULING BASED ON FREQUENCY DEPENDENT RESIDUAL SIDE BAND CANCELLATION CAPABILITY

FIELD OF THE DISCLOSURE

Aspects of the present disclosure generally relate to wireless communication and to techniques and apparatuses associated with frequency domain scheduling based on a frequency dependent residual side band (FDRSB) cancellation capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a network node, information that indicates a frequency dependent residual side band (FDRSB) cancellation capability. The method may include receiving, from the network node, information that indicates a frequency domain (FD) allocation assigned to the UE to mitigate FDRSB interference at the UE based at least in part on the information that indicates the FDRSB cancellation capability.

Some aspects described herein relate to a method of wireless communication performed by a network node. The method may include receiving, from a UE, information that indicates an FDRSB cancellation capability of the UE. The method may include transmitting, to the UE, information that indicates an FD allocation assigned to the UE to mitigate FDRSB interference at the UE based at least in part on the FDRSB cancellation capability of the UE.

Some aspects described herein relate to a UE for wireless communication. The UE may include a memory and one or more processors coupled to the memory. The one or more processors may be configured to transmit, to a network node, information that indicates an FDRSB cancellation capability. The one or more processors may be configured to receive, from the network node, information that indicates an FD allocation assigned to the UE to mitigate FDRSB interference at the UE based at least in part on the information that indicates the FDRSB cancellation capability.

Some aspects described herein relate to a network node for wireless communication. The network node may include a memory and one or more processors coupled to the memory. The one or more processors may be configured to receive, from a UE, information that indicates an FDRSB cancellation capability of the UE. The one or more processors may be configured to transmit, to the UE, information that indicates an FD allocation assigned to the UE to mitigate FDRSB interference at the UE based at least in part on the FDRSB cancellation capability of the UE.

Some aspects described herein relate to a non-transitory computer-readable medium that stores a set of instructions for wireless communication by a UE. The set of instructions, when executed by one or more processors of the UE, may cause the UE to transmit, to a network node, information that indicates an FDRSB cancellation capability. The set of instructions, when executed by one or more processors of the UE, may cause the UE to receive, from the network node, information that indicates an FD allocation assigned to the UE to mitigate FDRSB interference at the UE based at least in part on the information that indicates the FDRSB cancellation capability.

Some aspects described herein relate to a non-transitory computer-readable medium that stores a set of instructions for wireless communication by a network node. The set of instructions, when executed by one or more processors of the network node, may cause the network node to receive, from a UE, information that indicates an FDRSB cancellation capability of the UE. The set of instructions, when executed by one or more processors of the network node, may cause the network node to transmit, to the UE, information that indicates an FD allocation assigned to the UE to mitigate FDRSB interference at the UE based at least in part on the FDRSB cancellation capability of the UE.

Some aspects described herein relate to an apparatus for wireless communication. The apparatus may include means for transmitting, to a network node, information that indicates an FDRSB cancellation capability. The apparatus may include means for receiving, from the network node, information that indicates an FD allocation assigned to the UE to mitigate FDRSB interference at the UE based at least in part on the information that indicates the FDRSB cancellation capability.

Some aspects described herein relate to an apparatus for wireless communication. The apparatus may include means for receiving, from a UE, information that indicates an FDRSB cancellation capability of the UE. The apparatus may include means for transmitting, to the UE, information that indicates an FD allocation assigned to the UE to mitigate FDRSB interference at the UE based at least in part on the FDRSB cancellation capability of the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with frequency domain scheduling based on an FDRSB cancellation capability, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
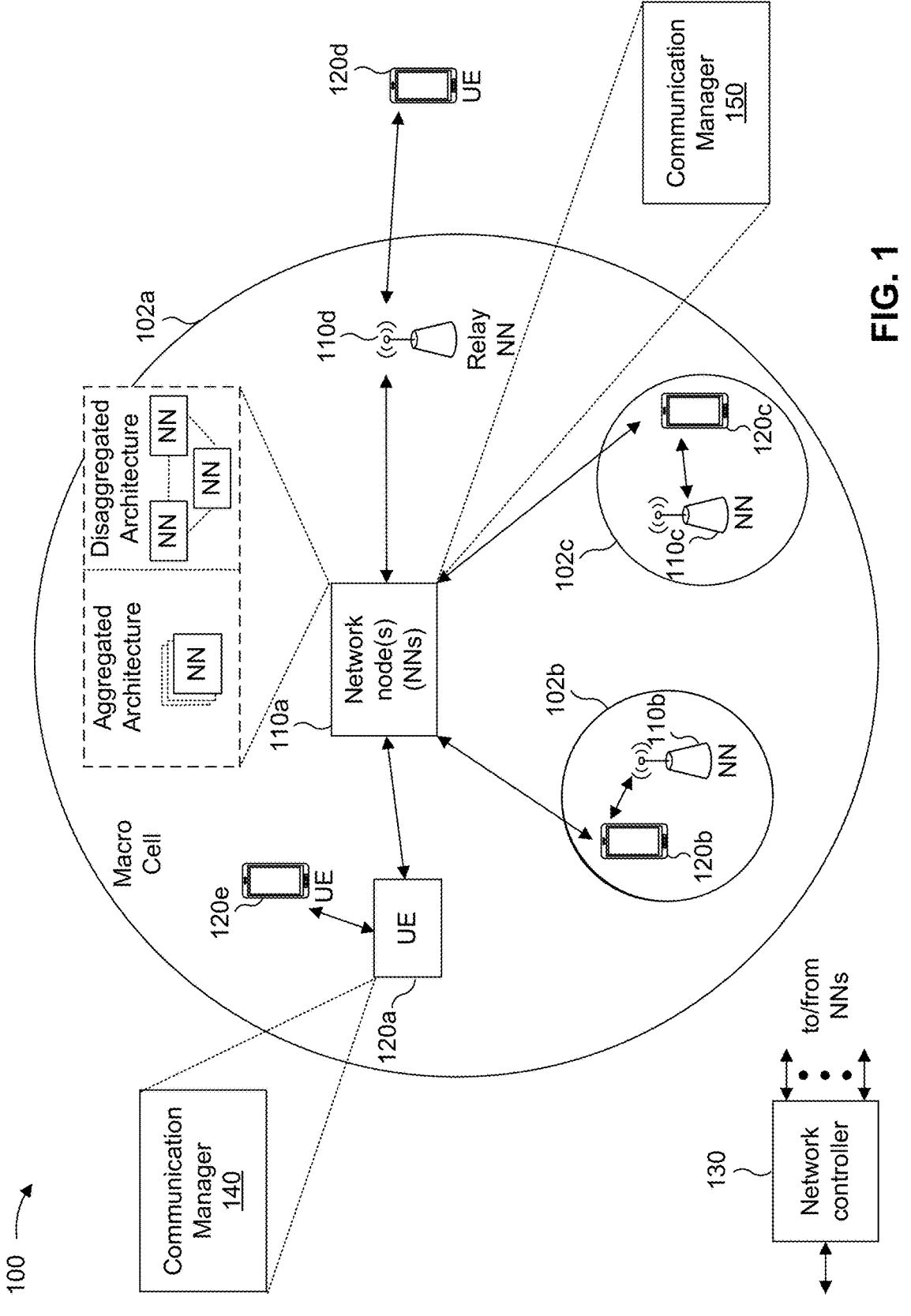
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node 110, information that indicates a frequency dependent residual side band (FDRSB) cancellation capability; and receive, from the network node, information that indicates a frequency domain (FD) allocation assigned to the UE 120 to mitigate FDRSB interference at the UE 120 based at least in part on the information that indicates the FDRSB cancellation capability. Additionally, or alternatively, the communication manager 140 may perform one or more other operations described herein.

In some aspects, the network node 110 may include a communication manager 150. As described in more detail elsewhere herein, the communication manager 150 may receive, from a UE 120, information that indicates an FDRSB cancellation capability of the UE 120; and transmit, to the UE 120, information that indicates an FD allocation assigned to the UE 120 to mitigate FDRSB interference at the UE 120 based at least in part on the FDRSB cancellation capability of the UE 120. Additionally, or alternatively, the communication manager 150 may perform one or more other operations described herein.

As indicated above, FIG. 1 is provided as an example. Other examples may differ from what is described with regard to FIG. 1.

Figure 2:
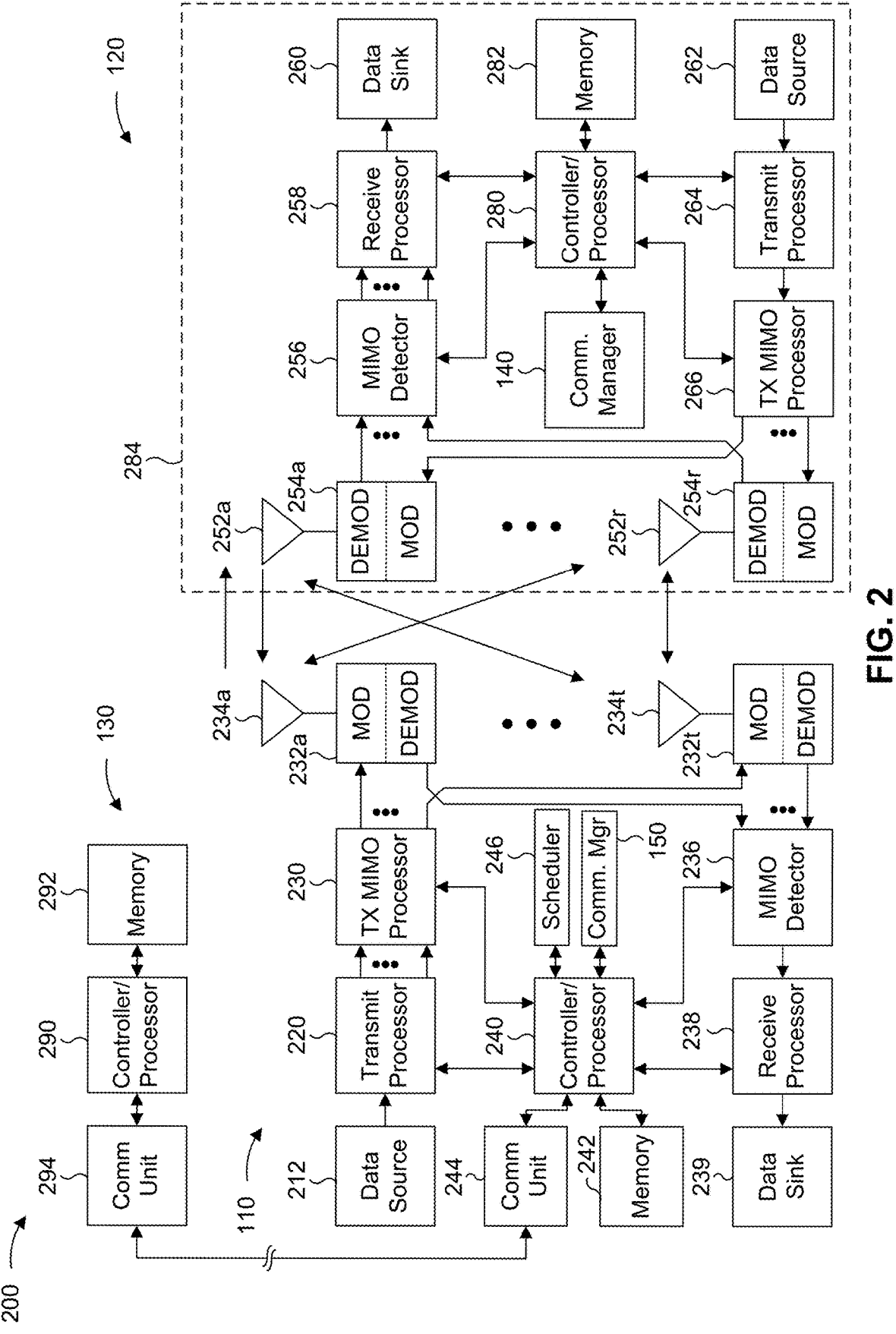
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6D and/or FIGS. 7-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6D and/or FIGS. 7-10).

The controller/processor 240 of the network node 110, the controller/processor 280 of the UE 120, and/or any other component(s) of FIG. 2 may perform one or more techniques associated with FD scheduling based on an FDRSB cancellation capability, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, UE 120 includes means for transmitting, to a network node 110, information that indicates an FDRSB cancellation capability; and/or means for receiving, from the network node 110, information that indicates an FD allocation assigned to the UE 120 to mitigate FDRSB interference at the UE 120 based at least in part on the information that indicates the FDRSB cancellation capability. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE 120, information that indicates an FDRSB cancellation capability of the UE 120; and/or means for transmitting, to the UE 120, information that indicates an FD allocation assigned to the UE 120 to mitigate FDRSB interference at the UE 120 based at least in part on the FDRSB cancellation capability of the UE 120. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, the DU, and the RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
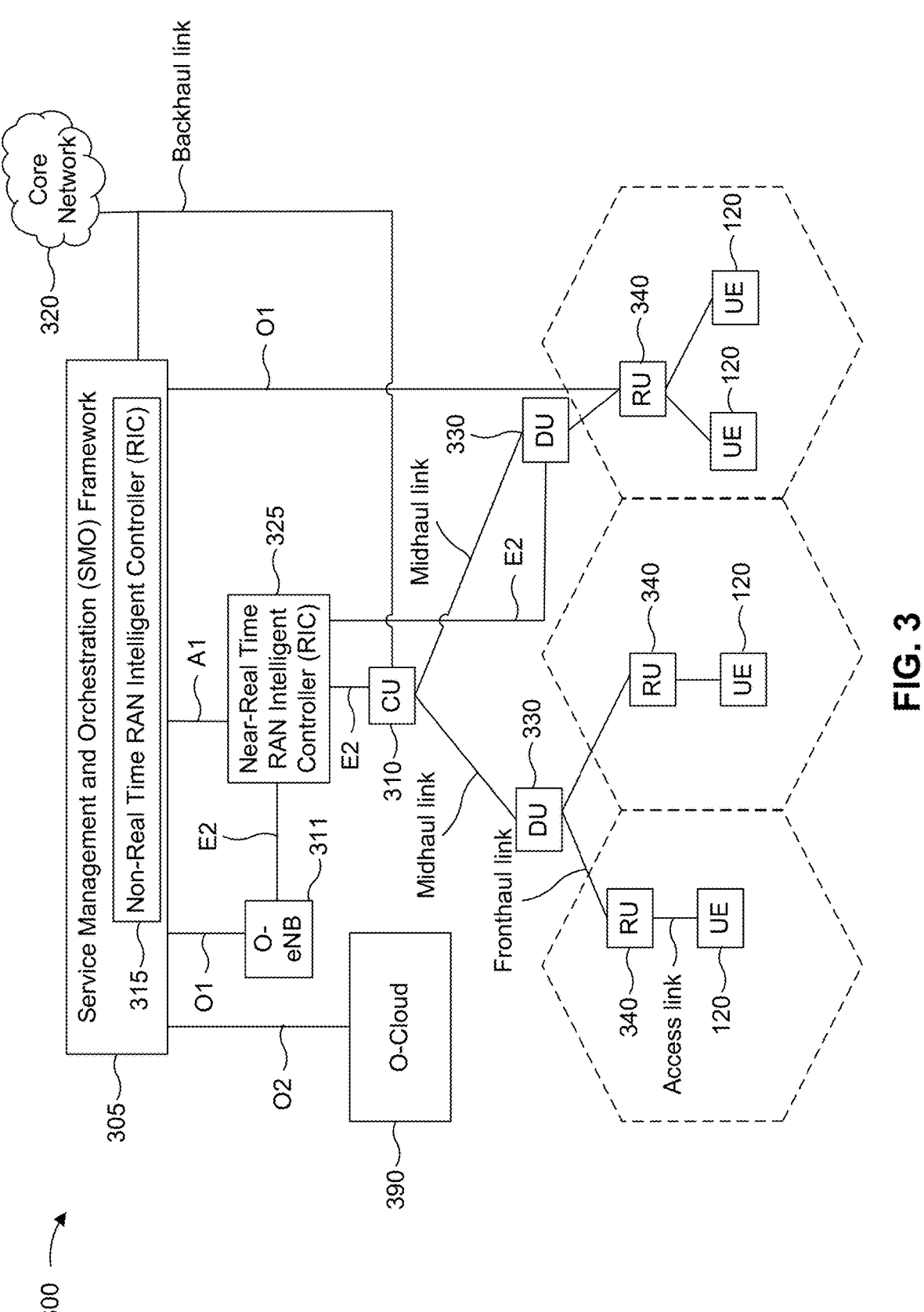
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
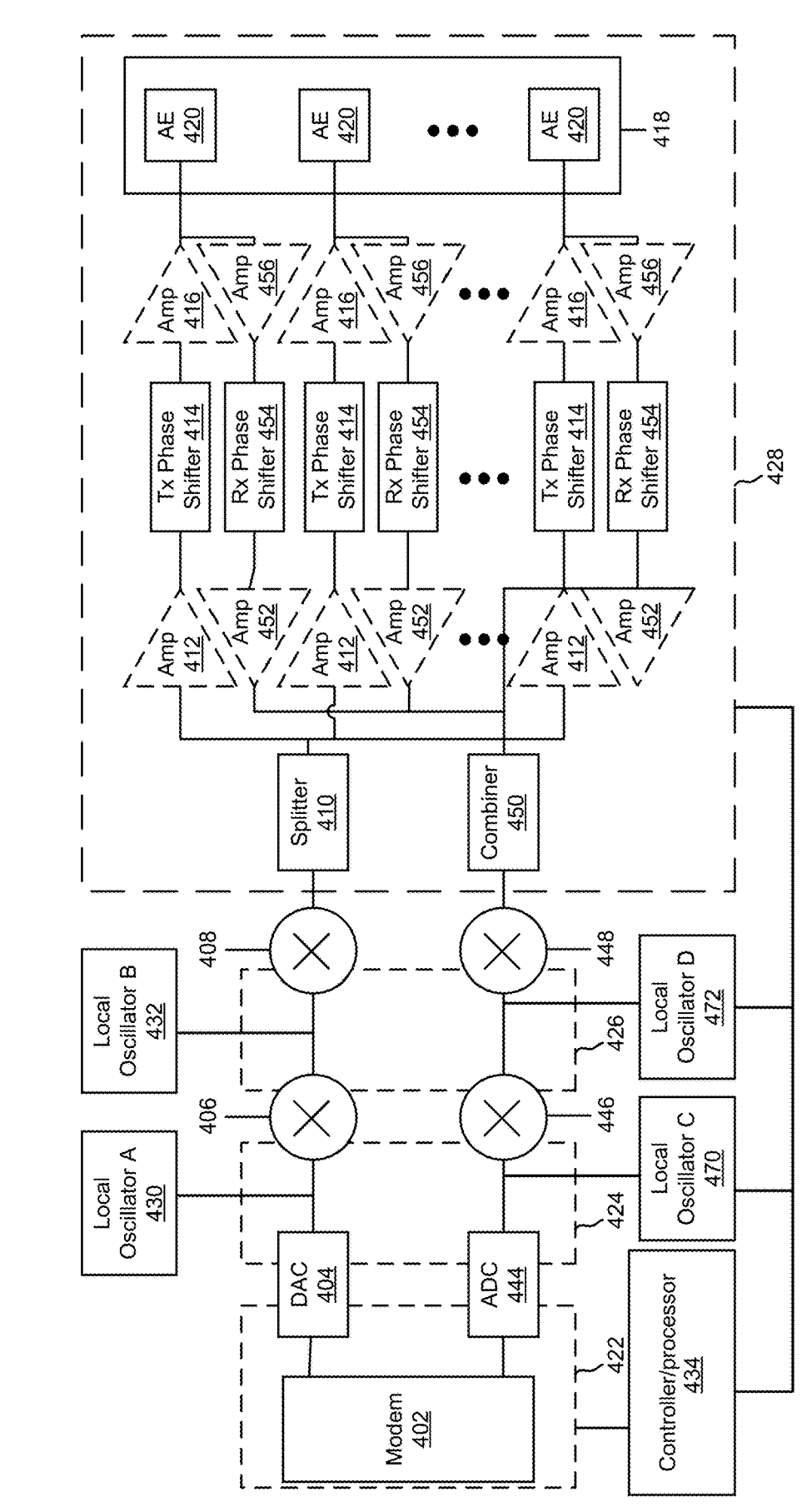
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may be implemented in a transmitting device (e.g., a first wireless communication device, UE, or network node) and/or a receiving device (e.g., a second wireless communication device, UE, or network node), as described herein.

Broadly, FIG. 4 illustrates example hardware components of a wireless communication device, which may include various hardware components that may be used for antenna element selection and/or for beamforming for transmission of wireless signals. There are numerous architectures for antenna element selection and implementing phase shifting, only one example of which is illustrated in FIG. 4. The beamforming architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated beamforming architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The beamforming architecture 400 is given by way of example only to illustrate an architecture for transmitting and/or receiving signals. In some cases, the beamforming architecture 400 and/or each portion of the beamforming architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5:
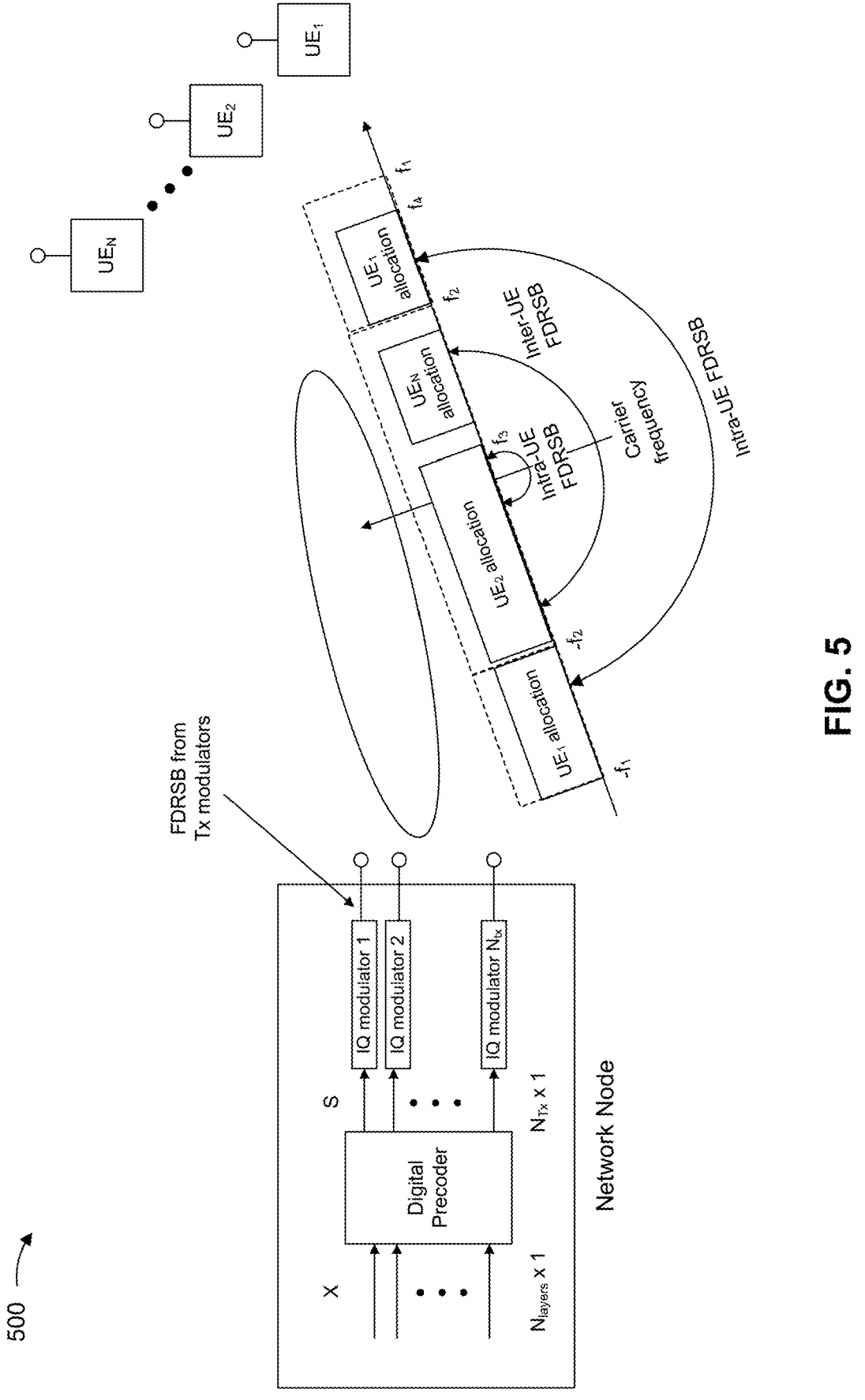
FIG. 5 is a diagram illustrating an example of frequency dependent residual side band (FDRSB) interference, in accordance with the present disclosure.

FIG. 5 is a diagram illustrating an example 500 of FDRSB interference, in accordance with the present disclosure. As shown in FIG. 5, example 500 includes communication between a network node and various UEs (e.g., shown as $UE_1$ through $UE_N$). In some aspects, the network node and the UEs may communicate in a wireless network, such as wireless network 100. The network node and the UEs may communicate via a wireless access link, which may include an uplink and a downlink.

In radio communications, a sideband is a range of frequencies higher or lower than a carrier frequency, which result from the modulation process. The sidebands carry the information transmitted by a radio signal, and the sidebands include all the spectral components of a modulated signal except the carrier. In general, signal components above the carrier frequency constitute an upper sideband, and signal components below the carrier frequency constitute a lower sideband. Although all modulation forms produce sidebands, there are some modulation forms that produce deleterious or otherwise undesirable impairments in a wireless signal. For example, in FIG. 5, the network node includes various in-phase and quadrature (IQ) modulators that generate signals to be transmitted based on an input from a digital precoder.

In some cases, the IQ modulators may be used to conserve bandwidth for a given data rate by modulating two orthogonal data streams (e.g., an in-phase (I) data stream and a quadrature (Q) data stream) onto a common carrier. If the phases and amplitudes for both data streams were to match, then one of the sidebands would be completely cancelled out. In practice, however, complete cancellation is rarely accomplished because IQ modulators typically have a mismatch with respect to amplitude and/or phase between the I and Q branches, which results in an FDRSB impairment at the output from each IQ modulator. For example, an FDRSB (sometimes called an IQ mismatch or frequency-dependent IQ mismatch) is an inherent impairment in an IQ modulator, and generally corresponds to a signal self-image caused by an IQ imbalance in an IQ modulator. The FDRSB may be a signal that generally has a smaller amplitude than a desired signal, appearing at a negative of a frequency of a desired signal. For example, a first signal that is allocated at subcarrier fi relative to a carrier frequency $f_c$ is subject to an FDRSB impairment by a second signal allocated at a mirror frequency −fi, and vice versa. In general, the characteristics of the FDRSB may vary depending one or more factors or parameters, such as the distance of the FDRSB from an LO frequency, a frequency band used for communication, a gain state, and/or a thermal state of the IQ modulator.

Accordingly, because an FDRSB is an undesired output from an IQ modulator that can increase bit errors or otherwise limit link performance in a wireless network, the FDRSB needs to be cancelled out. For example, in some cases, the network node may be equipped with dedicated hardware in each IQ modulator lane to cancel the corresponding FDRSB, where the dedicated hardware may include an RF demodulator feedback chain coupled to the output from an IQ modulator, an ADC to sample the output from the IQ modulator via the RF demodulator feedback chain, and one or more components to perform digital FDRSB estimation and cancellation (e.g., estimating a phase difference and/or an amplitude difference and compensating for the phase difference and/or amplitude difference in an imperfectly mixed information signal). However, as wireless networks have progressed to support mmW communications and expand into sub-terahertz (sub-THz) communications and beyond, the network node could potentially use many antennas that are fed by many IQ modulators in order to achieve a sufficiently narrow beamwidth (or high beamforming gain) to compensate for the path loss that occurs due to the high carrier frequency. As a result, the need for many antennas that are fed by numerous IQ chains may significantly increase the cost and complexity associated with burdening the network node with estimating and cancelling numerous FDRSB parameters across the numerous IQ modulator lanes (e.g., because each IQ modulator lane would need to be equipped with dedicated hardware to estimate and cancel the FDRSB in the respective IQ modulator lane).

Accordingly, because technology has advanced to a point where certain UEs have capabilities to perform FDRSB estimation and cancellation, at least some of the burden associated with FDRSB estimation and cancellation may be shifted from the network node to the served UEs. However, UEs generally lack universal support for FDRSB cancellation (e.g., some UEs may have a capability to correct an FDRSB image that interferes with a desired signal, and other UEs may be incapable of correcting an FDRSB image that interferes with a desired signal). Furthermore, in some cases, an FDRSB may take different forms, and UE capabilities to estimate and cancel an FDRSB image may vary depending on the form of the FDRSB. For example, FIG. 5 depicts an example where the network node is serving multiple UEs that are in the vicinity of each other, whereby the multiple UEs have to share a common beam (e.g., the network node is unable to mitigate interference by spatially separating signals that are transmitted to the various UEs). In this case, the network node may mitigate interference among the UEs that are sharing the common beam by communicating in a frequency division multiplexing (FDM) mode. For example, a bit-rate is typically ultra-high in mmW or sub-THz frequencies, whereby a carrier bandwidth can be simultaneously shared among multiple UEs in an FDM mode while still guaranteeing high throughput per UE.

For example, as shown in FIG. 5, the network node may assign to $UE_1$ a first frequency allocation that includes subcarriers from $-f_1$ to $-f_2$ and from $f_2$ to $-f_4$, may assign to $UE_2$ a second frequency allocation that includes subcarriers from $-f_2$ to $f_3$ (e.g., across the carrier frequency $f_c$), and may assign to $UE_N$ an third frequency allocation that includes a portion of subcarriers between $f_3$ and $f_2$. Because a given signal allocated at subcarrier fi is FDRSB impaired by another signal allocated at a mirror frequency $-fi$ (e.g., relative to a carrier frequency $f_c$), $UE_1$ is subject to only intra-UE FDRSB (or self-FDRSB), $UE_2$ is subject to intra-UE FDRSB and inter-UE FDRSB from $UE_N$, and $UE_N$ is subject to only inter-UE FDRSB from $UE_2$. Accordingly, in addition to UE capabilities varying with respect to whether different UEs are capable or incapable of performing FDRSB cancellation, UE capabilities may also vary among UEs that are capable of performing FDRSB cancellation. For example, some UEs may be capable of performing intra-UE FDRSB cancellation only, while other (e.g., more advanced) UEs may be capable of performing both intra-UE and inter-UE FDRSB cancellation. As a result, shifting the burden of performing FDRSB cancellation from the network node to the served UEs may pose challenges because some UEs may lack sufficient capabilities to estimate and cancel FDRSB interference with a desired signal.

Accordingly, some aspects described herein relate to techniques in which a UE may transmit, to a serving network node, information that indicates an FDRSB cancellation capability of the UE (e.g., whether the UE is incapable of FDRSB cancellation, capable of intra-UE FDRSB cancellation only, or capable of intra-UE and inter-UE FDRSB cancellation). The network node may then generate an FD allocation map that assigns an FD allocation to each served UE in a manner that eliminates or mitigates FDRSB at each served UE. For example, a UE that lacks FDRSB cancellation capabilities may be assigned an FD allocation that is free from FDRSB interference (e.g., a mirror FD allocation is vacant), and UEs that are capable of FDRSB cancellation may be assigned an FD allocation that is either free from FDRSB interference or subject to an FDRSB impairment that the UEs are capable of estimating and cancelling. In this way, the network node does not need to be equipped with dedicated hardware and/or does not need to perform a high complexity procedure to cancel an FDRSB in each IQ modulator lane, and served UEs may be aligned such that no UE is limited in performance due to FDRSB interference regardless of FDRSB cancellation capabilities.

As indicated above, FIG. 5 is provided as an example. Other examples may differ from what is described with regard to FIG. 5.

FIGS. 6A-6D are diagrams illustrating examples associated with frequency domain scheduling based on an FDRSB cancellation capability, in accordance with the present disclosure. As shown in FIGS. 6A-6D, examples 600 include communication between a network node and various UEs (e.g., shown as $UE_1$ through $UE_N$). In some aspects, the network node and the UEs may communicate in a wireless network, such as wireless network 100. The network node and the UEs may communicate via a wireless access link, which may include an uplink and a downlink.

Figure 6A:
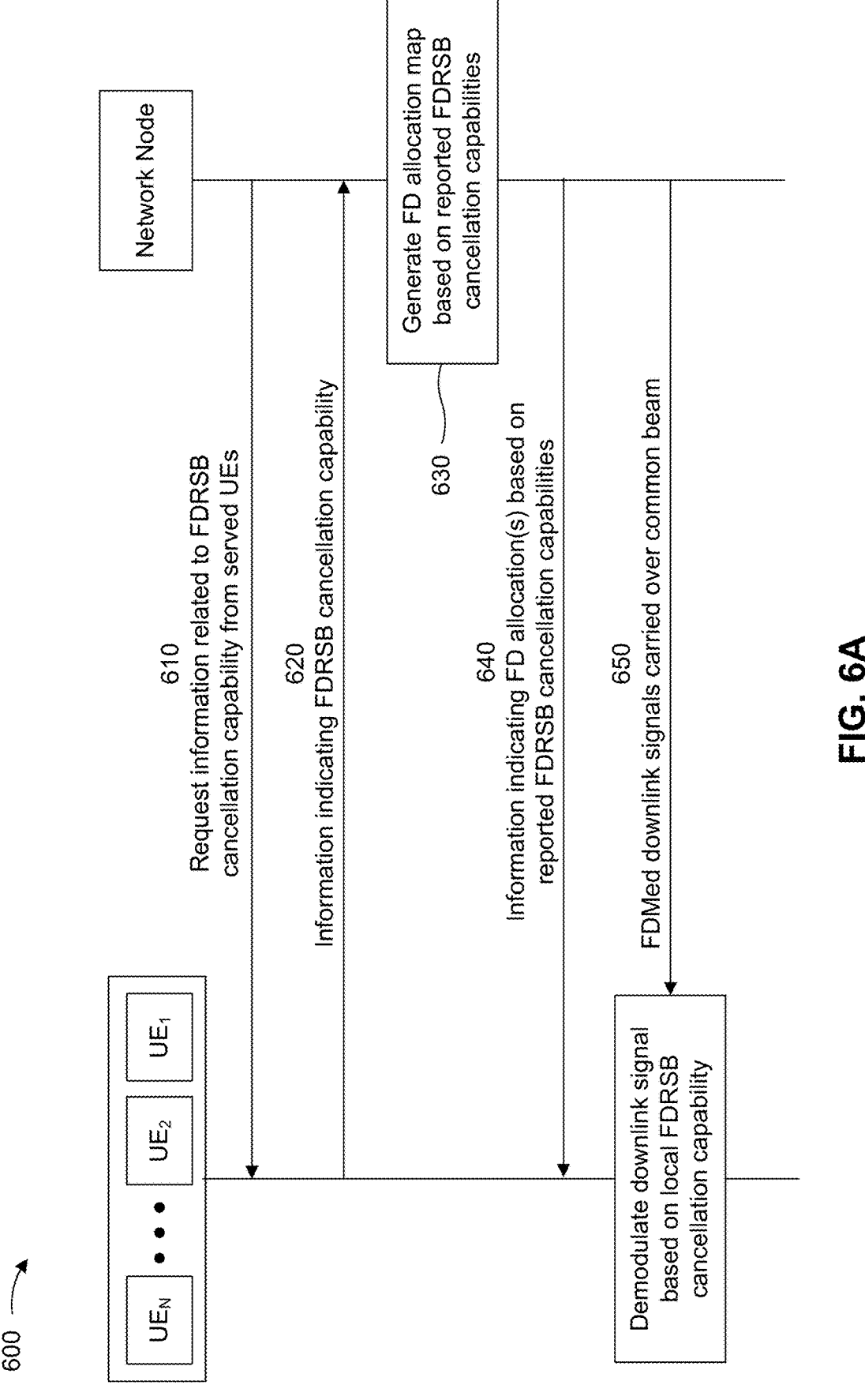
FIGS. 6A-6D are diagrams illustrating examples associated with frequency domain scheduling based on an FDRSB cancellation capability, in accordance with the present disclosure.

As shown in FIG. 6A, and by reference number 610, the network node may transmit, and the various UEs may each receive, a request for information related to an FDRSB cancellation capability. For example, in some aspects, the network node may request the information related to the FDRSB cancellation capability for each UE in a group of UEs that are served in an FDM mode (e.g., using a common beam), which could potentially result in inter-UE FDRSB interference (e.g., where an FD allocation assigned to a first UE at subcarrier fi is subject to an inter-UE FDRSB impairment based on a mirror frequency $-fi$ being assigned to a second UE). Furthermore, a UE served in the FDM mode may be subject to intra-UE FDRSB interference when an FD allocation assigned to the UE spans the carrier frequency $f_c$ or the FD allocation assigned to the UE includes a first set of subcarriers in an upper sideband and a second set of subcarriers that at least partially mirrors the first set of subcarriers in a lower sideband. Furthermore, although some aspects are described in herein in a context related to mitigating FDRSB interference in an FDM mode, it will be appreciated that the techniques described herein may be similarly applied to mitigate FDRSB in a spatial division multiplexing (SDM) mode (e.g., where different UEs are spatially separated via different beams, intra-UE FDRSB may still occur for a UE associated with a frequency allocation that includes subcarriers allocated at $\pm f_i$). Accordingly, as described herein, the network node may generally request information related to the FDRSB cancellation capabilities of each served UE, including whether a served UE has a capability to cancel FDRSB interference with a signal transmitted by the network node, and if so, the degree to which the served UE can cancel FDRSB interference (e.g., whether the UE can cancel intra-UE FDRSB interference only, or whether the UE can cancel intra-UE and inter-UE FDRSB interference).

Accordingly, as further shown in FIG. 6A, and by reference number 620, each served UE may transmit, to the network node, information that indicates an FDRSB cancellation capability of the UE. For example, in some aspects, a UE that lacks FDRSB cancellation capabilities may transmit information that indicates that the UE is incapable of estimating and/or cancelling FDRSB interference. Alternatively, a UE that can estimate and cancel FDRSB interference may transmit information that indicates that the UE is capable of estimating and cancelling FDRSB interference. In such cases, the FDRSB capability information may further indicate whether the UE has a capability to cancel intra-UE FDRSB interference only, or whether the UE has a capability to cancel both intra-UE and inter-UE FDRSB interference. For example, as described herein, intra-UE FDRSB interference (also referred to as self-FDRSB interference) may occur when a signal transmitted to a UE is subject to an FDRSB impairment that leaks into itself, and inter-UE FDRSB interference (also referred to as self- FDRSB interference) may occur when a signal transmitted to a UE is subject to an FDRSB impairment associated with a signal transmitted to a different UE.

As further shown in FIG. 6A, and by reference number 630, the network node may generate an FD allocation map that assigns a frequency allocation to each served UE based on the FDRSB capabilities of the served UEs. In particular, as described herein, the network node may generate the FD allocation to mitigate or eliminate FDRSB interference such that each served UE does not experience any FDRSB interference (e.g., either because the mirror frequencies are vacant or subject to an FDRSB impairment that is within the FDRSB cancellation capabilities of the UE). For example, in some aspects, any UEs that report being incapable of FDRSB cancellation may be assigned a frequency allocation that is free from FDRSB interference (e.g., the frequency allocation may include one or more subcarriers, and frequencies mirroring the one or more subcarriers included in the frequency allocation may be vacant or otherwise unoccupied to ensure that UEs without FDRSB cancellation capabilities will not experience any FDRSB interference). Furthermore, UEs that are capable of FDRSB cancellation may be assigned a frequency allocation that is either free from FDRSB interference (e.g., the mirror frequencies are vacant) or subject to an FDRSB impairment that the UEs are capable of estimating and cancelling. For example, a UE that is capable of intra-UE FDRSB cancellation only may be assigned a frequency allocation that is either free from FDRSB interference or subject to an intra-UE FDRSB impairment that the UE can estimate or cancel. In another example, a UE that is capable of intra-UE and inter-UE FDRSB cancellation may be assigned a frequency allocation that is either free from FDRSB interference or subject to an intra-UE FDRSB impairment or an inter-UE FDRSB impairment that the UE has a capability to estimate or cancel. In this way, the optimized FD allocation map may ensure that all served UEs experience no FDRSB interference, regardless of FDRSB cancellation capabilities.

Figure 6B:
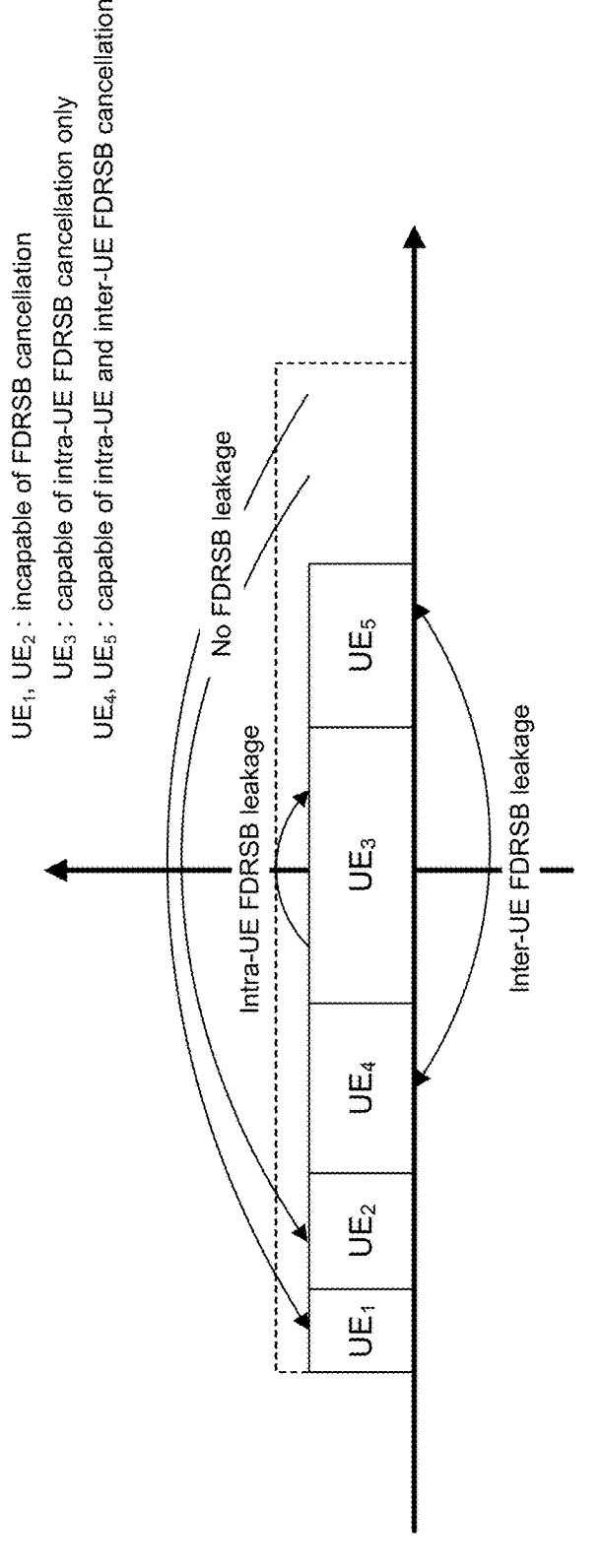

For example, FIG. 6B illustrates an example FD allocation map that the network node may generate based on FDRSB cancellation capabilities reported by five UEs that are served in an FDM mode using a common beam. For example, in FIG. 6B, a first UE and a second UE (shown as $UE_1$ and $UE_2$) report being incapable of FDRSB cancellation, a third UE (shown as $UE_3$) reports a capability to cancel only intra-UE FDRSB interference (e.g., the third UE cannot cancel inter-UE FDRSB interference), and a fourth UE and fifth UE (shown as $UE_1$ and $UE_2$) report capabilities to cancel both intra-UE and inter-UE FDRSB interference. Accordingly, because the first and second UEs have no FDRSB correction capabilities, the network node assigns frequency allocations to the first UE and the second UE that are free from FDRSB interference. For example, as shown in FIG. 6B, the first UE and the second UE are each allocated a set of subcarriers, and frequencies that mirror the subcarriers assigned to the first UE and the second UE are vacant (e.g., not assigned to any UE).

Furthermore, because the third UE has a capability to cancel only intra-UE FDRSB interference, the network node assigns a frequency allocation to the third UE that is subject to an intra-UE FDRSB impairment. For example, in FIG. 6B, a set of subcarriers assigned to the third UE crosses over the carrier frequency, whereby the set of subcarriers includes some mirrored frequencies that are subject to an intra-UE FDRSB impairment. Alternatively, in some cases, an intra-UE FDRSB impairment may occur in a split frequency allocation, where a UE is assigned a first set of subcarriers and a second set of subcarriers that includes some frequencies that mirror frequencies in the first set of subcarriers (e.g., as shown for $UE_1$ in FIG. 5). Furthermore, because the fourth and fifth UEs have capabilities to cancel intra-UE and inter-UE FDRSB interference, the network node assigns frequency allocations to the fourth and fifth UEs that are subject to inter-UE FDRSB interference (note that although the fourth and fifth UEs do not have to cancel intra-UE FDRSB interference in the example illustrated in FIG. 6B, the network node could assign frequency allocations to the fourth and/or fifth UEs that are subject to intra-UE FDRSB interference because the fourth and fifth UEs are capable of intra-UE FDRSB estimation and cancellation).

In some aspects, as described in further detail below, when the network node indicates the frequency allocations assigned to the respective UEs, the network node may indicate an FD allocation map and associated modulation orders to any UEs that are expected to handle inter-UE FDRSB estimation and cancellation. For example, in FIG. 6B, the network node may indicate, to the fourth UE, at least the frequency allocation assigned to the fifth UE and the associated modulation order, and may indicate, to the fifth UE, at least the frequency allocation assigned to the fourth UE and the associated modulation order. In this way, each UE that is subject to inter-UE FDRSB interference may have enough statistical information to iteratively estimate and cancel the FDRSB leaking into a desired signal.

Figure 6C:
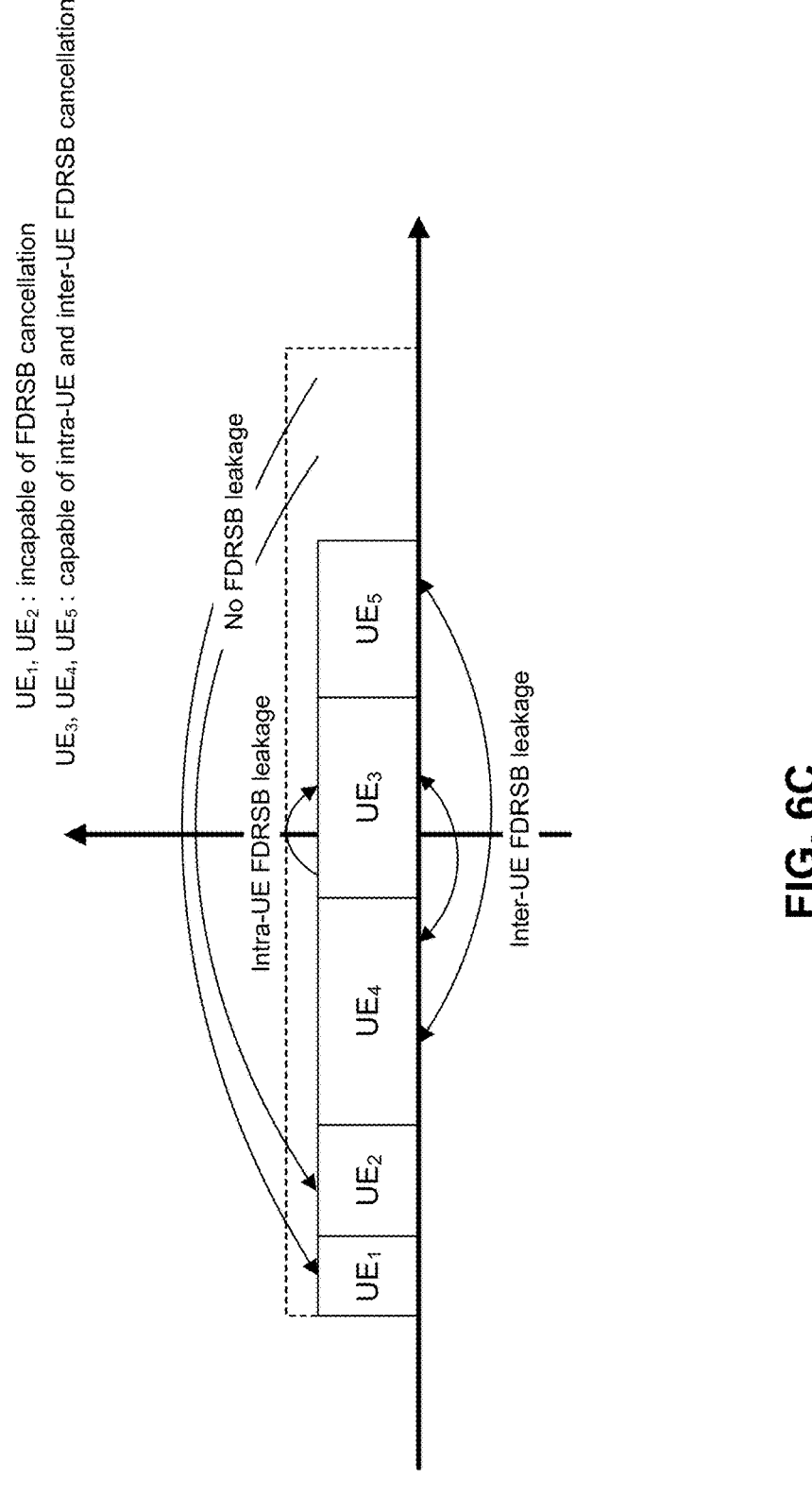

In another example, FIG. 6C depicts an FD allocation map that the network node may generate based on FDRSB cancellation capabilities reported by various served UEs. In particular, the reported FDRSB cancellation capabilities in FIG. 6C are similar to those shown in FIG. 6B, except that the third UE also indicates a capability to cancel both intra-UE and inter-UE FDRSB interference. In this case, the network node may generate the FD allocation map such that the frequency allocation assigned to the third UE includes some frequencies that are subject to intra-UE FDRSB interference and some frequencies that are subject to inter-UE FDRSB interference from a frequency allocation assigned to the fourth UE. Accordingly, in the example shown in FIG. 6C, the fourth UE is assigned a frequency allocation that is subject to an inter-UE FDRSB impairment from frequency allocations assigned to the third and fifth UEs, whereby the network node may inform the fourth UE of the frequency allocations assigned to the third and fifth UEs and the associated modulation orders. Furthermore, the third UE is assigned a frequency allocation that is subject to an inter-UE FDRSB impairment from frequency allocation assigned to the fourth UE, whereby the network node may inform the third UE of the frequency allocation assigned to the fourth UE and the associated modulation order. Similarly, because the fifth UE is assigned a frequency allocation that is subject to an inter-UE FDRSB impairment from frequency allocation assigned to the fourth UE, the network node may inform the fifth UE of the frequency allocation assigned to the fourth UE and the associated modulation order. More generally, each UE that is responsible for estimating and cancelling inter-UE FDRSB interference may receive information that indicates the FD allocation associated with any frequencies that mirror the frequencies assigned to the UE, including vacant frequencies (e.g., such that the UE may refrain from performing any FDRSB estimation or cancellation for frequencies that are mirrored by frequencies that are vacant or unoccupied).

Referring again to FIG. 6A, and to reference number 640, the network node may transmit, to each served UE, information that indicates the FD allocation assigned to the respective UE based on the FDRSB cancellation capabilities that were reported by the respective UEs. Furthermore, in some aspects, the network node may transmit, to one or more of the served UEs, information that indicates the FD allocation map and associated modulation orders (e.g., to enable inter-UE FDRSB estimation and cancellation). For example, in some aspects, the network node may transmit a full FD allocation map to each served UE, and each served UE may refer to the full FD allocation map to determine information relevant to FDRSB cancellation to be performed by the respective UE. Alternatively, because the FD allocations assigned to other UEs may be needed only for UEs that are capable of handling inter-UE FDRSB interference, the network node may transmit the FD allocation map and associated modulation orders only to UEs that reported a capability to estimate and cancel inter-UE FDRSB interference. Additionally, or alternatively, the network node may transmit a custom FD allocation map to the UEs that reported a capability to estimate and cancel inter-UE FDRSB interference, where the custom FD application only indicates FD allocations and associated modulation orders for frequencies that are potentially relevant to the inter-UE FDRSB cancellation to be performed by the UEs. For example, in some aspects, the custom FD allocation map may indicate the frequency allocations and associated modulation orders only for frequencies that mirror frequencies assigned to the UE, including vacant frequencies that are not subject to any FDRSB interference.

Accordingly, as shown by reference number 650, the network node may transmit, to the various served UEs, FDMed downlink signals that are carried over a common beam, and each served UE may demodulate a received downlink signal based on local FDRSB cancellation capabilities. In some aspects, as described herein, the network node may transmit the FDMed downlink signals without performing any FDRSB estimation and/or cancellation on the FDMed downlink signals, as the burden of performing FDRSB estimation and/or cancellation may be shifted to the served UEs that have FDRSB estimation and cancellation capabilities. For example, any served UEs that lack FDRSB cancellation capabilities may receive downlink signals that are free from FDRSB interference, whereby the served UEs without FDRSB cancellation capabilities may demodulate received downlink signals in a normal manner (e.g., as described above with respect to FIG. 2). In other examples, served UEs that have capabilities to cancel intra-UE FDRSB interference may receive downlink signals that are free from FDRSB interference or subject to an intra-UE FDRSB impairment, the latter of which may be estimated and cancelled to demodulate the received signal. In other examples, served UEs that have capabilities to cancel inter-UE FDRSB interference may receive downlink signals that are free from FDRSB interference or subject to an intra-UE or inter-UE FDRSB impairment, the latter of which may be estimated and cancelled to demodulate the received signal. In this case, the UEs that may potentially need to cancel inter-UE FDRSB interference may demodulate the received signal using an iterative demodulator, based on the FD allocation map and associated modulation orders provided by the network node (it will also be appreciated that the UEs that may need to cancel only intra-UE FDRSB interference may similarly demodulate the received signal using an iterative demodulator, but may not need the network node to provide the FD allocation map and associated modulation orders because the allocation status and modulation orders of any mirror frequencies would be indicated in the frequency allocation provided by the network node).

Figure 6D:
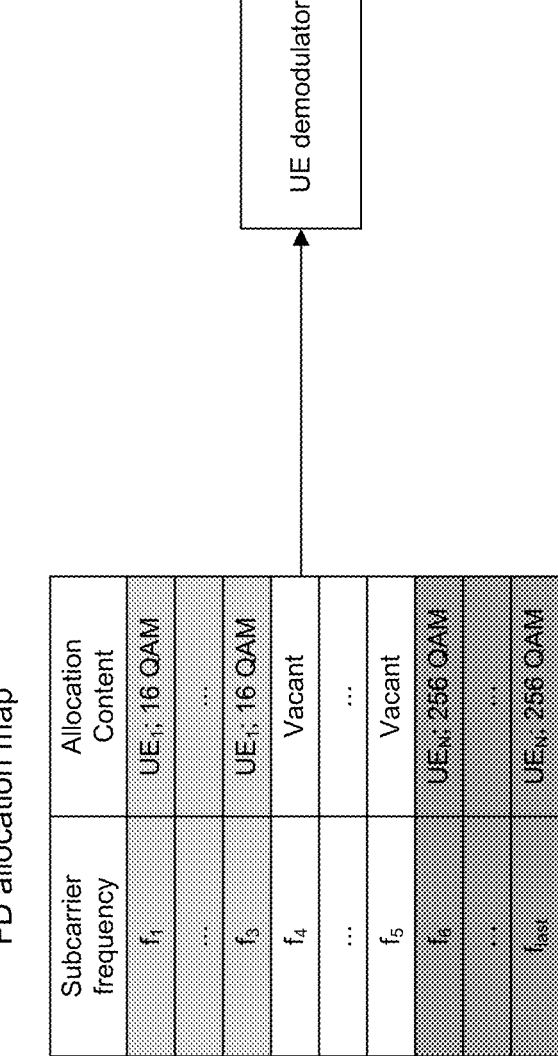

For example, FIG. 6D illustrates an FD allocation map that the network node may provide to a UE that can estimate and cancel inter-UE FDRSB interference, which may be used as an input to an iterative demodulator that the UE uses to estimate and cancel FDRSB interference. For example, in FIG. 6D, the FD allocation map indicates a first set of subcarriers that are allocated to a first UE (e.g., from $f_1$ to $f_3$) and a modulation order associated with signals that are transmitted to the first UE in the first set of subcarriers (e.g., 16 QAM). Furthermore, the FD allocation indicates a second set of subcarriers that are vacant (e.g., from $f_4$ to $f_5$), and a third set of subcarriers that are allocated to an Nth UE (e.g., from $f_6$ $f_{last}$) and a modulation order associated with signals that are transmitted to the Nth UE in the third set of subcarriers (e.g., 256 QAM). Accordingly, the iterative demodulator of the UE may use the information provided by the network node to determine which subcarriers are vacant and to determine which modulation order is configured per occupied subcarrier frequency, across the entire frequency band. Alternatively, in some aspects, the UE may filter the FD allocation map, or the network node may provide a custom FD allocation map, to include allocation content (including associated modulation orders and/or vacancy status) only for the subcarriers that mirror subcarriers included in the frequency allocation assigned to the UE. Accordingly, for each mirrored subcarrier that is occupied by another signal (e.g., an intra-UE or inter-UE signal), the UE may use the iterative demodulator to successively suppress leaked FDRSB interference.

For example, the iterative demodulator may use tentative hard decisions over a relevant portion of the subcarrier frequencies (e.g., a portion of the subcarrier frequencies that mirror subcarrier frequencies allocated to the UE). In some aspects, the tentative hard decisions may be made by engaging a hard slicer unit, which generally needs to know the modulation order per every observed subcarrier frequency. In cases where the iterative demodulator is used to cancel intra-UE FDRSB interference, the modulation order may be known to the UE because the network node indicates the modulation order to the UE. Alternatively, in cases where the iterative demodulator is used to cancel inter-UE FDRSB interference, the modulation order for subcarriers occupied by other UEs may be indicated in the FD allocation map provided by the network node. Furthermore, in some aspects, the iterative demodulator may exploit knowledge that a particular subcarrier is vacant, which allows the iterative demodulator to set an FDRSB value to zero (0) for a transmitted signal at that subcarrier (e.g., the vacant subcarrier does not interfere or cause FDRSB leakage to a mirror subcarrier).

In some aspects, to demodulate a received signal that may be subject to FDRSB interference or leakage, a UE with suitable FDRSB estimation and cancellation capabilities may first estimate a residual sideband (RSB) level per frequency bin during a training stage. Accordingly, each UE with suitable FDRSB estimation and cancellation capabilities may determine an RSB level per frequency that the UE can correct to signals received in one or more data slots, denoted RSB_LEVEL(f), and the UE may initialize the iterative demodulator, as follows:

$$Z_{corrected}^{(iteration\ 0)}(f)=Z(f)$$

where Z is a received signal and f is a frequency of the received signal. In some aspects, the iterative demodulator may then calculate one or more tentative hard decisions based on the negative frequency that mirrors the frequency of the received signal (e.g., relative to the center carrier frequency) and the associated modulation order, as follows:

$$\hat{X}_{HD}^{(iteration\ 0)}(-f)=HD(Z_{corrected}^{(iteration\ 0)}(-f),$$
$$modulation\_order=Q)$$

where Q is the modulation order of either the observed UE (e.g., the UE that received the signal being demodulated) in the case of intra-UE FDRSB cancellation or a modulation order of a neighbor UE occupying the mirror frequency in the case of intra-UE FDRSB cancellation, depending on the desired mirror frequency, −f, in the argument denoted $Z_{corrected}^{(iteration\ 0)}(-f)$. In the latter case, where Q is the modulation order of a neighbor UE occupying the mirror frequency, the modulation order may be determined from the FD allocation map and the associated modulation order indicated by the network node, as described above. At this point, there may be no symbol error or a small symbol error, which may be diminished after one or more subsequent iterations. For example, in some aspects, the iterative demodulator may then determine corrections for subsequent iterations, as follows:

$$Z_{corrected}^{(iteration\ i)}(f)=Z(f)-RSB\_LEVEL(f)\cdot$$
$$\hat{X}_{HD}^{*(iteration\ i-1)}(-f)$$

In this way, in a first iteration (e.g., i=1), the iterative demodulator may subtract, from an original received signal (e.g., stored in a buffer), an estimation of the FDRSB leakage associated with the original received signal, which is based on the RSB level that was estimated in the training stage and the initial set of tentative hard decisions. In this way, if the tentative hard decisions are accurate, the IQ mismatch or FDRSB impairment may be completely cancelled out. In practice, however, the initial tentative hard decisions may be imperfect, due to additive noise or other factors that may impact the accuracy of the tentative hard decisions. Nonetheless, even if there is a small error in the tentative hard decisions in a previous iteration, the estimated FDRSB leakage may capture a majority or a significant portion of the actual FDRSB leakage, which reduces the level of FDRSB interference with the received signal. Accordingly, the iterative demodulator may calculate a new set of tentative hard decisions that will capture all or most of the remaining FDRSB interference in a next iteration, as follows:

$$\hat{X}_{HD}^{(iteration\ i)}(-f)=HD(Z_{corrected}^{(iteration\ i)}(-f),$$
$$modulation\_order=Q)$$

where this iterative process may be repeated until the FDRSB leakage has been completely cancelled out (e.g., when a current iteration of the iterative demodulator produces a set of tentative hard decisions associated with an estimated FDRSB interference that is zero (0) or otherwise satisfies a threshold). Furthermore, in cases where the UE determines that the mirror frequency −f is vacant, the UE may avoid performing FDRSB estimation and/or cancellation for a received signal at Z(f). For example, in such cases, the iterative demodulator may set RSB_LEVEL(f) to zero (0) because the received signal at Z(f) does not suffer from FDRSB leakage due to the mirror frequency −f being vacant.

As indicated above, FIGS. 6A-6D are provided as examples. Other examples may differ from what is described with regard to FIGS. 6A-6D.

FIG. 7 is a diagram illustrating an example process 700 performed, for example, by a UE, in accordance with the present disclosure. Example process 700 is an example where the UE (e.g., UE 120) performs operations associated with FD scheduling based on an FDRSB cancellation capability.

As shown in FIG. 7, in some aspects, process 700 may include transmitting, to a network node, information that indicates an FDRSB cancellation capability (block 710). For example, the UE (e.g., using communication manager 140 and/or transmission component 904, depicted in FIG. 9) may transmit, to a network node, information that indicates an FDRSB cancellation capability, as described above.

As further shown in FIG. 7, in some aspects, process 700 may include receiving, from the network node, information that indicates an FD allocation assigned to the UE to mitigate FDRSB interference at the UE based at least in part on the information that indicates the FDRSB cancellation capability (block 720). For example, the UE (e.g., using communication manager 140 and/or reception component 902, depicted in FIG. 9) may receive, from the network node, information that indicates an FD allocation assigned to the UE to mitigate FDRSB interference at the UE based at least in part on the information that indicates the FDRSB cancellation capability, as described above.

Process 700 may include additional aspects, such as any single aspect or any combination of aspects described below and/or in connection with one or more other processes described elsewhere herein.

In a first aspect, process 700 includes receiving, from the network node, a request to report the information that indicates the FDRSB cancellation capability based at least in part on the network node operating in an FDM mode.

In a second aspect, alone or in combination with the first aspect, the FDRSB cancellation capability indicates that the UE is incapable of cancelling FDRSB interference.

In a third aspect, alone or in combination with one or more of the first and second aspects, the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

In a fourth aspect, alone or in combination with one or more of the first through third aspects, the FDRSB cancellation capability indicates that the UE is capable of cancelling only intra-UE FDRSB interference.

In a fifth aspect, alone or in combination with one or more of the first through fourth aspects, the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

In a sixth aspect, alone or in combination with one or more of the first through fifth aspects, process 700 includes receiving, from the network node, a signal in a subcarrier in the second set of subcarriers that is included in the FD allocation assigned to the UE, and performing intra-UE FDRSB cancellation to demodulate the received signal.

In a seventh aspect, alone or in combination with one or more of the first through sixth aspects, the FDRSB cancellation capability indicates that the UE is capable of cancelling both intra-UE and inter-UE FDRSB interference.

In an eighth aspect, alone or in combination with one or more of the first through seventh aspects, the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

In a ninth aspect, alone or in combination with one or more of the first through eighth aspects, process 700 includes receiving, from the network node, a signal in a subcarrier in the second set of subcarriers that is included in the FD allocation assigned to the UE, and performing intra-UE FDRSB cancellation to demodulate the received signal.

In a tenth aspect, alone or in combination with one or more of the first through ninth aspects, process 700 includes receiving, from the network node, a signal in a subcarrier in the second set of subcarriers that is included in the FD allocation assigned to the other UE, and performing inter-UE FDRSB cancellation to demodulate the received signal.

In an eleventh aspect, alone or in combination with one or more of the first through tenth aspects, process 700 includes receiving, from the network node, an FD allocation map that indicates, for each subcarrier in a frequency band associated with an FDM mode, a UE allocation and a modulation order associated with the subcarrier, wherein the inter-UE FDRSB cancellation is performed using an iterative demodulator based at least in part on the FD allocation map.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
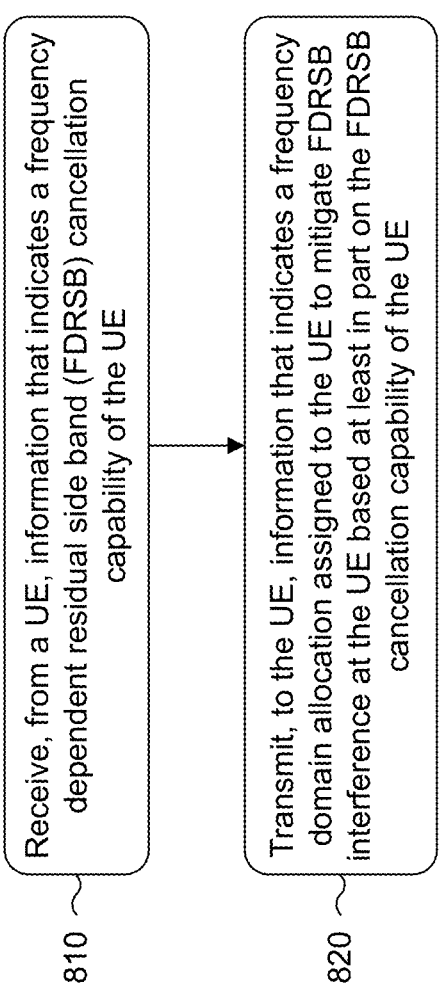

FIG. 8 is a diagram illustrating an example process 800 performed, for example, by a network node, in accordance with the present disclosure. Example process 800 is an example where the network node (e.g., network node 110) performs operations associated with FD scheduling based on an FDRSB cancellation capability.

As shown in FIG. 8, in some aspects, process 800 may include receiving, from a UE, information that indicates an FDRSB cancellation capability of the UE (block 810). For example, the network node (e.g., using communication manager 150 and/or reception component 1002, depicted in FIG. 10) may receive, from a UE, information that indicates an FDRSB cancellation capability of the UE, as described above.

As further shown in FIG. 8, in some aspects, process 800 may include transmitting, to the UE, information that indicates an FD allocation assigned to the UE to mitigate FDRSB interference at the UE based at least in part on the FDRSB cancellation capability of the UE (block 820). For example, the network node (e.g., using communication manager 150 and/or transmission component 1004, depicted in FIG. 10) may transmit, to the UE, information that indicates an FD allocation assigned to the UE to mitigate FDRSB interference at the UE based at least in part on the FDRSB cancellation capability of the UE, as described above.

Process 800 may include additional aspects, such as any single aspect or any combination of aspects described below and/or in connection with one or more other processes described elsewhere herein.

In a first aspect, process 800 includes transmitting, to the UE, a request to report the information that indicates the FDRSB cancellation capability based at least in part on the network node operating in an FDM mode.

In a second aspect, alone or in combination with the first aspect, the FDRSB cancellation capability indicates that the UE is incapable of cancelling FDRSB interference.

In a third aspect, alone or in combination with one or more of the first and second aspects, the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

In a fourth aspect, alone or in combination with one or more of the first through third aspects, the FDRSB cancellation capability indicates that the UE is capable of cancelling only intra-UE FDRSB interference.

In a fifth aspect, alone or in combination with one or more of the first through fourth aspects, the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

In a sixth aspect, alone or in combination with one or more of the first through fifth aspects, the FDRSB cancellation capability indicates that the UE is capable of cancelling both intra-UE and inter-UE FDRSB interference.

In a seventh aspect, alone or in combination with one or more of the first through sixth aspects, the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

In an eighth aspect, alone or in combination with one or more of the first through seventh aspects, process 800 includes transmitting, to the UE, an FD allocation map that indicates, for each subcarrier in a frequency band associated with an FDM mode, a UE allocation and a modulation order associated with the respective subcarrier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
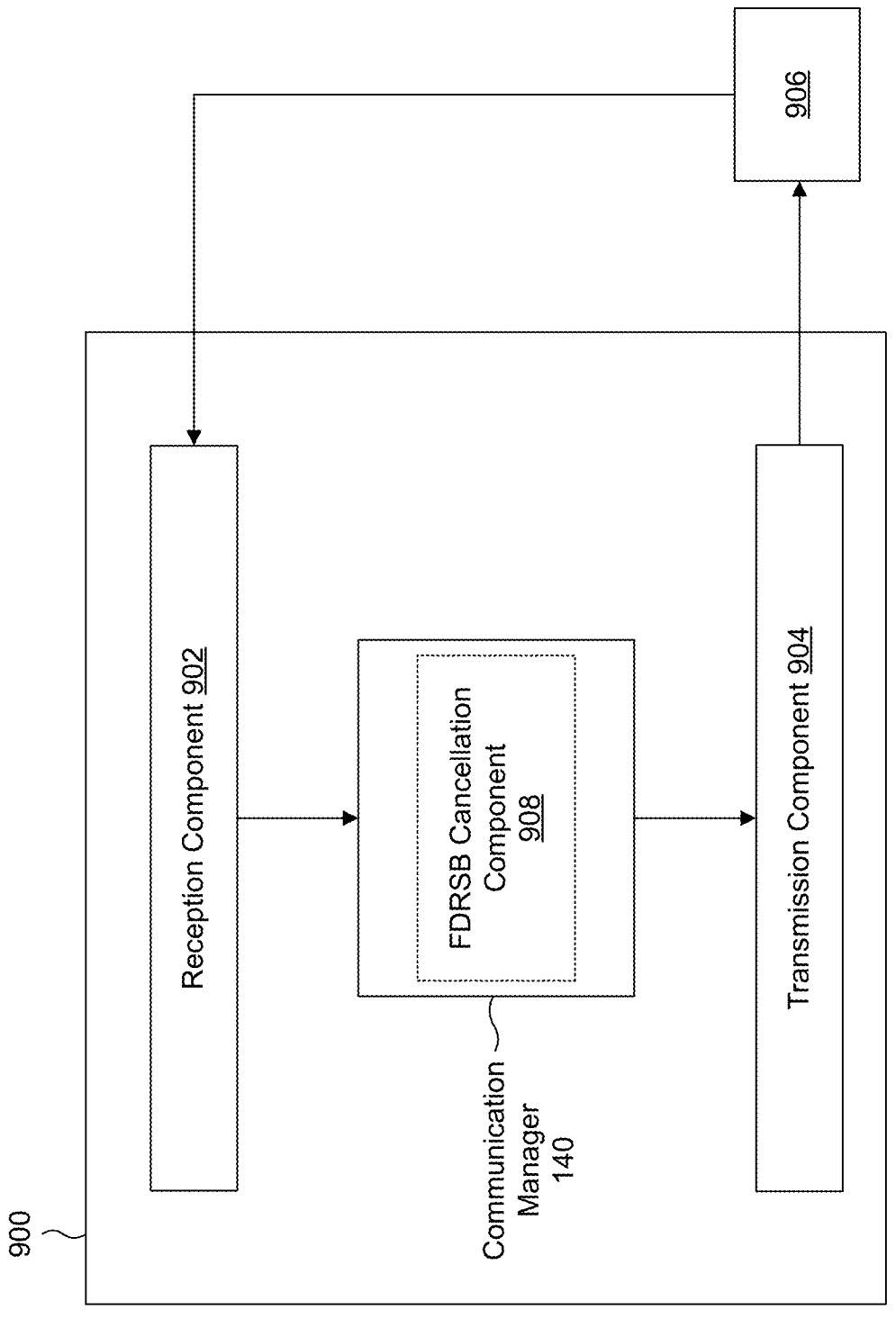
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include an FDRSB cancellation component 908, among other examples.

In some aspects, the apparatus 900 may be configured to perform one or more operations described herein in connection with FIGS. 6A-6D. Additionally, or alternatively, the apparatus 900 may be configured to perform one or more processes described herein, such as process 700 of FIG. 7.

In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit, to a network node, information that indicates an FDRSB cancellation capability. The reception component 902 may receive, from the network node, information that indicates an FD allocation assigned to the UE to mitigate FDRSB interference at the UE based at least in part on the information that indicates the FDRSB cancellation capability.

The reception component 902 may receive, from the network node, a request to report the information that indicates the FDRSB cancellation capability based at least in part on the network node operating in an FDM mode.

The reception component 902 may receive, from the network node, a signal in a subcarrier in the second set of subcarriers that is included in the FD allocation assigned to the UE. The FDRSB cancellation component 908 may perform intra-UE FDRSB cancellation to demodulate the received signal.

The reception component 902 may receive, from the network node, a signal in a subcarrier in the second set of subcarriers that is included in the FD allocation assigned to the UE. The FDRSB cancellation component 908 may perform intra-UE FDRSB cancellation to demodulate the received signal.

The reception component 902 may receive, from the network node, a signal in a subcarrier in the second set of subcarriers that is included in the FD allocation assigned to the other UE. The FDRSB cancellation component 908 may perform inter-UE FDRSB cancellation to demodulate the received signal.

The reception component 902 may receive, from the network node, an FD allocation map that indicates, for each subcarrier in a frequency band associated with an FDM mode, a UE allocation and a modulation order associated with the subcarrier, wherein the inter-UE FDRSB cancellation is performed using an iterative demodulator based at least in part on the FD allocation map.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
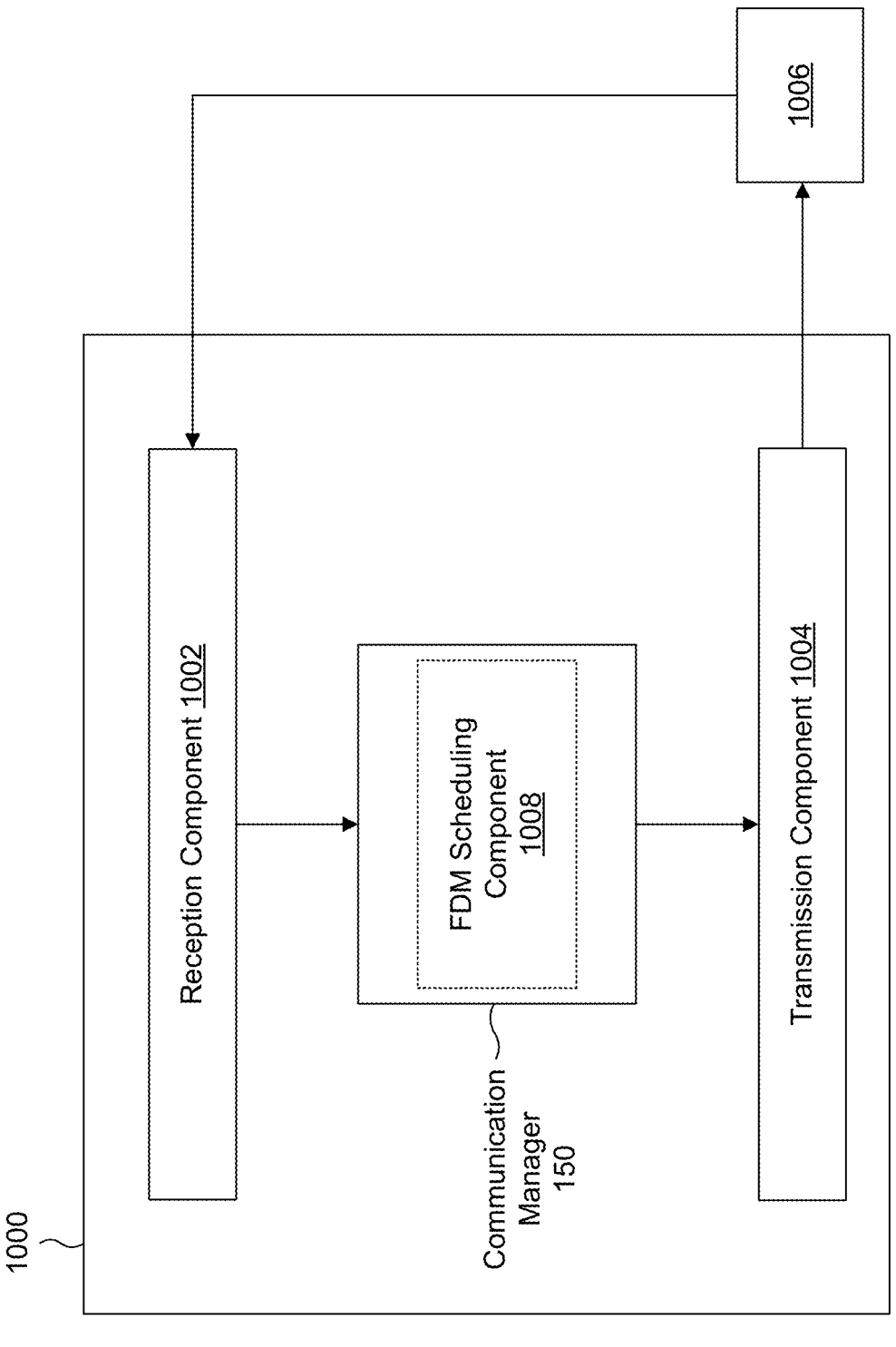

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include an FDM scheduling component 1008, among other examples.

In some aspects, the apparatus 1000 may be configured to perform one or more operations described herein in connection with FIGS. 6A-6D. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive, from a UE, information that indicates an FDRSB cancellation capability of the UE. The FDM scheduling component 1008 may assign an FD allocation to the UE to mitigate FDRSB interference at the UE based at least in part on the FDRSB cancellation capability of the UE. The transmission component 1004 may transmit, to the UE, information that indicates the FD allocation assigned to the UE to mitigate FDRSB interference at the UE based at least in part on the FDRSB cancellation capability of the UE.

The transmission component 1004 may transmit, to the UE, a request to report the information that indicates the FDRSB cancellation capability based at least in part on the network node operating in an FDM mode.

The transmission component 1004 may transmit, to the UE, an FD allocation map that indicates, for each subcarrier in a frequency band associated with an FDM mode, a UE allocation and a modulation order associated with the respective subcarrier.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting, to a network node, information that indicates an FDRSB cancellation capability; and receiving, from the network node, information that indicates an FD allocation assigned to the UE to mitigate FDRSB interference at the UE based at least in part on the information that indicates the FDRSB cancellation capability.

Aspect 2: The method of Aspect 1, further comprising: receiving, from the network node, a request to report the information that indicates the FDRSB cancellation capability based at least in part on the network node operating in an FDM mode.

Aspect 3: The method of any of Aspects 1-2, wherein the FDRSB cancellation capability indicates that the UE is incapable of cancelling FDRSB interference.

Aspect 4: The method of Aspect 3, wherein the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

Aspect 5: The method of any of Aspects 1-2, wherein the FDRSB cancellation capability indicates that the UE is capable of cancelling only intra-UE FDRSB interference.

Aspect 6: The method of Aspect 5, wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

Aspect 7: The method of Aspect 6, further comprising: receiving, from the network node, a signal in a subcarrier in the second set of subcarriers that is included in the FD allocation assigned to the UE; and performing intra-UE FDRSB cancellation to demodulate the received signal.

Aspect 8: The method of any of Aspects 1-2, wherein the FDRSB cancellation capability indicates that the UE is capable of cancelling both intra-UE and inter-UE FDRSB interference.

Aspect 9: The method of Aspect 8, wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

Aspect 10: The method of Aspect 9, further comprising: receiving, from the network node, a signal in a subcarrier in the second set of subcarriers that is included in the FD allocation assigned to the UE; and performing intra-UE FDRSB cancellation to demodulate the received signal.

Aspect 11: The method of any of Aspects 9-10, further comprising: receiving, from the network node, a signal in a subcarrier in the second set of subcarriers that is included in the FD allocation assigned to the other UE; and performing inter-UE FDRSB cancellation to demodulate the received signal.

Aspect 12: The method of Aspect 11, further comprising: receiving, from the network node, an FD allocation map that indicates, for each subcarrier in a frequency band associated with an FDM mode, a UE allocation and a modulation order associated with the subcarrier, wherein the inter-UE FDRSB cancellation is performed using an iterative demodulator based at least in part on the FD allocation map.

Aspect 13: A method of wireless communication performed by a network node, comprising: receiving, from a UE, information that indicates an FDRSB cancellation capability of the UE; and transmitting, to the UE, information that indicates an FD allocation assigned to the UE to mitigate FDRSB interference at the UE based at least in part on the FDRSB cancellation capability of the UE.

Aspect 14: The method of Aspect 13, further comprising: transmitting, to the UE, a request to report the information that indicates the FDRSB cancellation capability based at least in part on the network node operating in an FDM mode.

Aspect 15: The method of any of Aspects 13-14, wherein the FDRSB cancellation capability indicates that the UE is incapable of cancelling FDRSB interference.

Aspect 16: The method of Aspect 15, wherein the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

Aspect 17: The method of any of Aspects 13-14, wherein the FDRSB cancellation capability indicates that the UE is capable of cancelling only intra-UE FDRSB interference.

Aspect 18: The method of Aspect 17, wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

Aspect 19: The method of any of Aspects 13-14, wherein the FDRSB cancellation capability indicates that the UE is capable of cancelling both intra-UE and inter-UE FDRSB interference.

Aspect 20: The method of Aspect 19, wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

Aspect 21: The method of Aspect 20, further comprising: transmitting, to the UE, an FD allocation map that indicates, for each subcarrier in a frequency band associated with an FDM mode, a UE allocation and a modulation order associated with the respective subcarrier.

Aspect 22: An apparatus for wireless communication at a device, comprising a processor; memory coupled with the processor; and instructions stored in the memory and executable by the processor to cause the apparatus to perform the method of one or more of Aspects 1-12.

Aspect 23: A device for wireless communication, comprising a memory and one or more processors coupled to the memory, the one or more processors configured to perform the method of one or more of Aspects 1-12.

Aspect 24: An apparatus for wireless communication, comprising at least one means for performing the method of one or more of Aspects 1-12.

Aspect 25: A non-transitory computer-readable medium storing code for wireless communication, the code comprising instructions executable by a processor to perform the method of one or more of Aspects 1-12.

Aspect 26: A non-transitory computer-readable medium storing a set of instructions for wireless communication, the set of instructions comprising one or more instructions that, when executed by one or more processors of a device, cause the device to perform the method of one or more of Aspects 1-12.

Aspect 27: An apparatus for wireless communication at a device, comprising a processor; memory coupled with the processor; and instructions stored in the memory and executable by the processor to cause the apparatus to perform the method of one or more of Aspects 13-21.

Aspect 28: A device for wireless communication, comprising a memory and one or more processors coupled to the memory, the one or more processors configured to perform the method of one or more of Aspects 13-21.

Aspect 29: An apparatus for wireless communication, comprising at least one means for performing the method of one or more of Aspects 13-21.

Aspect 30: A non-transitory computer-readable medium storing code for wireless communication, the code comprising instructions executable by a processor to perform the method of one or more of Aspects 13-21.

Aspect 31: A non-transitory computer-readable medium storing a set of instructions for wireless communication, the set of instructions comprising one or more instructions that, when executed by one or more processors of a device, cause the device to perform the method of one or more of Aspects 13-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  receiving, from a network node, a request to report information that indicates a frequency dependent residual side band (FDRSB) cancellation capability;
  transmitting, to the network node, the information that indicates FDRSB cancellation capability, wherein the FDRSB cancellation capability indicates whether the UE is incapable of FDRSB cancellation, capable of intra-UE FDRSB cancellation only, or capable of both intra-UE and inter-UE FDRSB cancellation; and
  receiving, from the network node, information that indicates a frequency domain (FD) allocation assigned to the UE to mitigate FDRSB interference at the UE based at least in part on the information that indicates the FDRSB cancellation capability.

2. The method of claim 1,
  wherein the request is based at least in part on the network node operating in a frequency division multiplexing (FDM) mode.

3. The method of claim 1,
  wherein the FDRSB cancellation capability indicates that the UE is incapable of FDRSB cancellation.

4. The method of claim 3,
  wherein the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

5. The method of claim 1,
  wherein the FDRSB cancellation capability indicates that the UE is capable intra-UE FDRSB cancellation-only.

6. The method of claim 5,
  wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

7. The method of claim 6, further comprising:
  receiving, from the network node, a signal in a subcarrier in the second set of subcarriers that is included in the FD allocation assigned to the UE; and
  performing intra-UE FDRSB cancellation to demodulate the received signal.

8. The method of claim 1,
  wherein the FDRSB cancellation capability indicates that the UE is capable of both intra-UE and inter-UE FDRSB cancellation.

9. The method of claim 8,
  wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

10. The method of claim 9, further comprising:
  receiving, from the network node, a signal in a subcarrier in the second set of subcarriers that is included in the FD allocation assigned to the UE; and
  performing intra-UE FDRSB cancellation to demodulate the received signal.

11. The method of claim 9, further comprising:
  receiving, from the network node, a signal in a subcarrier in the second set of subcarriers that is included in the FD allocation assigned to the other UE; and
  performing inter-UE FDRSB cancellation to demodulate the received signal.

12. The method of claim 11, further comprising:
  receiving, from the network node, an FD allocation map that indicates, for each subcarrier in a frequency band associated with a frequency division multiplexing (FDM) mode, a UE allocation and a modulation order associated with the subcarrier, wherein the inter-UE FDRSB cancellation is performed using an iterative demodulator based at least in part on the FD allocation map.

13. A method of wireless communication performed by a network node, comprising:
  transmitting, to a user equipment (UE), a request to report information that indicates a frequency dependent residual side band (FDRSB) cancellation capability;
  receiving, from the UE, the information that indicates the FDRSB cancellation capability of the UE, wherein the FDRSB cancellation capability of the UE indicates whether the UE is incapable of FDRSB cancellation, capable of intra-UE FDRSB cancellation only, or capable of both intra-UE and inter-UE FDRSB cancellation; and
  transmitting, to the UE, information that indicates a frequency domain (FD) allocation assigned to the UE to mitigate FDRSB interference at the UE based at least in part on the FDRSB cancellation capability of the UE.

14. The method of claim 13, wherein the request is based at least in part on the network node operating in a frequency division multiplexing (FDM) mode.

15. The method of claim 13, wherein the FDRSB cancellation capability indicates that the UE is incapable of FDRSB cancellation.

16. The method of claim 15, wherein the FD allocation includes a first set of subcarriers, and wherein each subcarrier in a second set of subcarriers that mirrors the first set of subcarriers is vacant based at least in part on the FDRSB cancellation capability indicating that the UE is incapable of cancelling FDRSB interference.

17. The method of claim 13, wherein the FDRSB cancellation capability indicates that the UE is capable intra-UE FDRSB cancellation-only.

18. The method of claim 17, wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of cancelling only intra-UE FDRSB interference.

19. The method of claim 13, wherein the FDRSB cancellation capability indicates that the UE is capable of both intra-UE and inter-UE FDRSB cancellation.

20. The method of claim 19, wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of cancelling both intra-UE and inter-UE FDRSB interference.

21. The method of claim 20, further comprising: transmitting, to the UE, an FD allocation map that indicates, for each subcarrier in a frequency band associated with a frequency division multiplexing (FDM) mode, a UE allocation and a modulation order associated with the respective subcarrier.

22. A user equipment (UE) for wireless communication, comprising:
a memory; and
one or more processors, coupled to the memory, configured to:
receive, from a network node, a request to report information that indicates a frequency dependent residual side band (FDRSB) cancellation capability;
transmit, to the network node, the information that indicates the FDRSB cancellation capability, wherein the FDRSB cancellation capability indicates whether the UE is incapable of FDRSB cancellation, capable of intra-UE FDRSB cancellation only, or capable of both intra-UE and inter-UE FDRSB cancellation; and
receive, from the network node, information that indicates a frequency domain (FD) allocation assigned to the UE to mitigate FDRSB interference at the UE based at least in part on the information that indicates the FDRSB cancellation capability.

23. The UE of claim 22, wherein the FD allocation includes a first set of subcarriers, and wherein each subcarrier in a second set of subcarriers that mirrors the first set of subcarriers is vacant based at least in part on the FDRSB cancellation capability indicating that the UE is incapable of FDRSB cancellation.

24. The UE of claim 22, wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of intra-UE FDRSB cancellation only.

25. The UE of claim 22, wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of both intra-UE and inter-UE FDRSB cancellation.

26. The UE of claim 22, wherein the one or more processors are further configured to:
receive, from the network node, an FD allocation map that indicates, for each subcarrier in a frequency band associated with a frequency division multiplexing (FDM) mode, a UE allocation and a modulation order associated with the subcarrier.

27. A network node for wireless communication, comprising:
a memory; and
one or more processors, coupled to the memory, configured to:
transmit, to a user equipment (UE), a request to report information that indicates a frequency dependent residual side band (FDRSB) cancellation capability;
receive, from the UE, the information that indicates the FDRSB cancellation capability of the UE, wherein the FDRSB cancellation capability of the UE indicates whether the UE is incapable of FDRSB cancellation, capable of intra-UE FDRSB cancellation only, or capable of both intra-UE and inter-UE FDRSB cancellation; and
transmit, to the UE, information that indicates a frequency domain (FD) allocation assigned to the UE to mitigate FDRSB interference at the UE based at least in part on the FDRSB cancellation capability of the UE.

28. The network node of claim 27, wherein the FD allocation includes a first set of subcarriers, and wherein each subcarrier in a second set of subcarriers that mirrors the first set of subcarriers is vacant based at least in part on the FDRSB cancellation capability indicating that the UE is incapable of FDRSB cancellation.

29. The network node of claim 27, wherein the FD allocation includes a first set of subcarriers, and wherein each subcarrier in a second set of subcarriers that mirrors the first set of subcarriers is vacant or included in the FD allocation assigned to the UE based at least in part on the FDRSB cancellation capability indicating that the UE is capable of intra-UE FDRSB cancellation only.

30. The network node of claim 27, wherein the FD allocation includes a first set of subcarriers, and wherein each subcarrier in a second set of subcarriers that mirrors the first set of subcarriers is vacant, included in the FD allocation assigned to the UE, or included in an FD allocation assigned to another UE based at least in part on the FDRSB cancellation capability indicating that the UE is capable of both intra-UE and inter-UE FDRSB cancellation.

* * * * *